(12) United States Patent
Hafner et al.

(10) Patent No.: US 11,179,917 B2
(45) Date of Patent: Nov. 23, 2021

(54) CMC PLY ASSEMBLY, CMC ARTICLE, AND METHOD FOR FORMING CMC ARTICLE

(71) Applicant: GENERAL ELECTRIC COMPANY, Schenectady, NY (US)

(72) Inventors: Matthew Troy Hafner, Honea Path, SC (US); John McConnell Delvaux, Fountain Inn, SC (US); Glenn Curtis Taxacher, Simpsonville, SC (US); Zachary John Snider, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 960 days.

(21) Appl. No.: 15/401,575

(22) Filed: Jan. 9, 2017

(65) Prior Publication Data
US 2018/0194688 A1 Jul. 12, 2018

(51) Int. Cl.
*B32B 18/00* (2006.01)
*C04B 35/573* (2006.01)
(Continued)

(52) U.S. Cl.
CPC ............ *B32B 18/00* (2013.01); *C04B 35/573* (2013.01); *C04B 35/80* (2013.01); *C04B 37/005* (2013.01);
(Continued)

(58) Field of Classification Search
CPC ..... C04B 35/80; C04B 35/803; C04B 35/806; C04B 35/78; C04B 35/82; C04B 35/83;
(Continued)

(56) References Cited

U.S. PATENT DOCUMENTS

| 5,614,596 A | * | 3/1997 | Laine | ..................... B82Y 30/00 525/389 |
| 2004/0096619 A1 | * | 5/2004 | DiChiara, Jr. | .......... C04B 35/18 428/76 |

(Continued)

OTHER PUBLICATIONS

Dr. D. Kopeliovich, "Fabrication of Ceramic Matrix Composites by Liquid Silicon Infiltration (LSI)", SubsTech Substances & Technologies, http://www.substech.com/dokuwiki/doku.php?id=fabrication_of_ceramic_matrix_composites_by_liquid_silicon_infiltration_lsi, Jun. 2, 2012.

*Primary Examiner* — Humera N. Sheikh
*Assistant Examiner* — Elizabeth D Ivey
(74) *Attorney, Agent, or Firm* — McNees Wallace & Nurick LLC

(57) ABSTRACT

A CMC ply assembly is disclosed including at least one matrix ply interspersed amongst a plurality of CMC plies. Each of the plurality of CMC plies includes a first matrix and a plurality of ceramic fibers. The at least one matrix ply includes a second matrix and is essentially free of ceramic fibers. The plurality of CMC plies and the at least one matrix ply are arranged in an undensified ply stack having an article conformation. A CMC article is disclosed including a plurality of densified CMC plies and at least one densified matrix ply interspersed amongst the plurality of densified CMC plies. A method for forming the CMC article is disclosed including forming, carburizing, infusing a melt infiltration agent into, and densifying the CMC ply assembly. The melt infiltration agent infuses more completely through the at least one matrix ply than through the plurality of CMC plies.

20 Claims, 2 Drawing Sheets

(51) Int. Cl.
   *C04B 35/80*    (2006.01)
   *C04B 37/00*    (2006.01)
   *F01D 25/00*    (2006.01)
   *F01D 5/28*     (2006.01)
   *F01D 9/02*     (2006.01)

(52) U.S. Cl.
   CPC ............. *C04B 2235/3826* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2237/083* (2013.01); *C04B 2237/365* (2013.01); *C04B 2237/38* (2013.01); *C04B 2237/61* (2013.01); *C04B 2237/704* (2013.01); *F01D 5/282* (2013.01); *F01D 9/02* (2013.01); *F01D 25/005* (2013.01); *F05D 2300/6033* (2013.01)

(58) Field of Classification Search
   CPC ............ C04B 2237/38; C04B 2237/30; C04B 2237/32; C04B 2237/36
   See application file for complete search history.

(56) References Cited

U.S. PATENT DOCUMENTS

| | | | |
|---|---|---|---|
| 2004/0191411 A1 | 9/2004 | Hornor et al. | |
| 2008/0143005 A1* | 6/2008 | Lim ..................... | C04B 35/565 |
| | | | 264/29.2 |
| 2016/0326064 A1* | 11/2016 | Shim ..................... | C04B 35/565 |

* cited by examiner

… (1)

CMC PLY ASSEMBLY, CMC ARTICLE, AND METHOD FOR FORMING CMC ARTICLE

FIELD OF THE INVENTION

The present invention is directed to ceramic matrix composite ("CMC") ply assemblies, CMC articles, and methods for forming CMC articles. More particularly, the present invention is directed to CMC ply assemblies, CMC articles, and methods for forming CMC articles in which at least one matrix ply is interspersed amongst a plurality of CMC plies.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, airfoils, buckets (blades), bucket (blade) dovetails, nozzles (vanes), shrouds, combustor liners, combustor transition pieces, disks, ducts, augmentors, exhaust nozzles, and casings, from CMC. However, CMC components, particularly those CMC components which include thick solid sections, may be difficult to densify due to insufficiently complete melt infiltration throughout the thick solid section.

BRIEF DESCRIPTION OF THE INVENTION

In an exemplary embodiment, a CMC ply assembly includes a plurality of CMC plies and at least one matrix ply interspersed amongst the plurality of CMC plies. Each of the plurality of CMC plies includes a first matrix and a plurality of ceramic fibers. The at least one matrix ply includes a second matrix and is essentially free of ceramic fibers. The plurality of CMC plies and the at least one matrix ply are arranged in an undensified ply stack having an article conformation.

In another exemplary embodiment, a CMC article includes a plurality of densified CMC plies and at least one densified matrix ply interspersed amongst the plurality of densified CMC plies. Each of the plurality of densified CMC plies includes a first ceramic matrix and a plurality of ceramic fibers, and the at least one densified matrix ply includes a second ceramic matrix and is essentially free of ceramic fibers.

In another exemplary embodiment, a method for forming a CMC article includes forming a CMC ply assembly. Forming the CMC ply assembly includes laying up a plurality of CMC plies and interspersing at least one matrix ply amongst the plurality of CMC plies. Each of the plurality of CMC plies includes a first matrix and a plurality of ceramic fibers. The at least one matrix ply includes a second matrix and is essentially free of ceramic fibers. The plurality of CMC plies and the at least one matrix ply are arranged in an undensified ply stack having an article conformation. The CMC ply assembly is carbonized, and a melt infiltration agent is infused into the CMC ply assembly. The melt infiltration agent infuses more completely through the at least one matrix ply than through the plurality of CMC plies. The CMC ply assembly is densified with the melt infiltration agent to form the CMC article.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary CMC ply assemblies, CMC articles, and methods for forming CMC articles. Embodiments of the present disclosure, in comparison to articles and methods not utilizing one or more features disclosed herein, decrease costs, increase process efficiency, increase quality, increase durability, increase strength, increase process yield, or a combination thereof.

Figure 1:
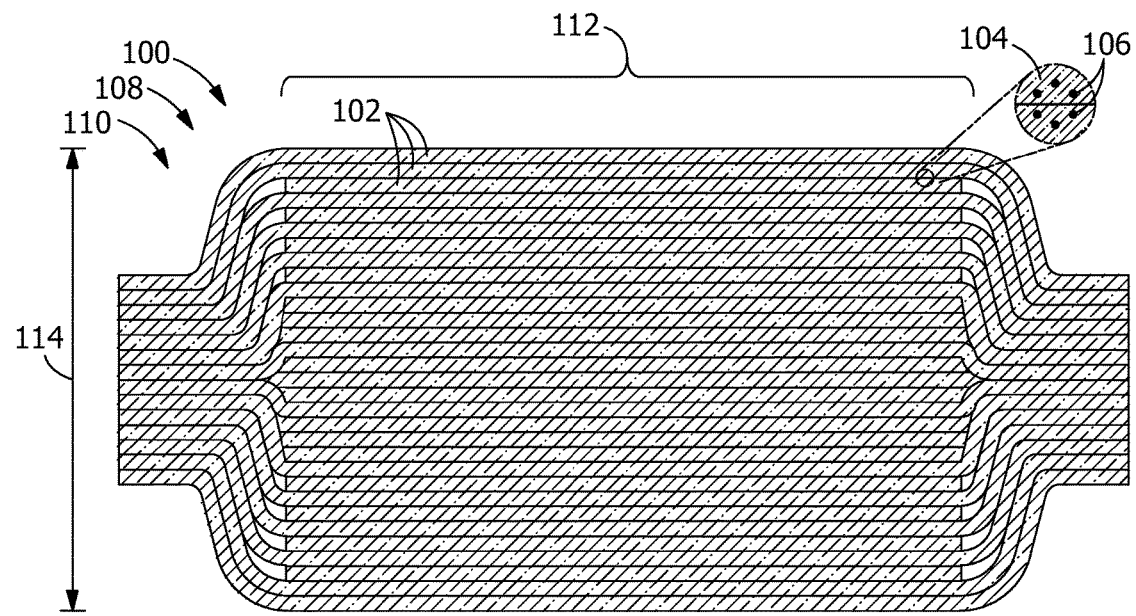
FIG. 1 is a schematic sectional view of a non-inventive CMC ply assembly.

Referring to FIG. 1, in a non-inventive embodiment, a CMC ply assembly 100 includes a plurality of CMC plies 102. Each of the CMC plies 102 includes a first matrix 104 and a plurality of ceramic fibers 106. The plurality of CMC plies 102 are arranged in an undensified ply stack 108 having an article conformation 110. The CMC ply assembly 100 includes a portion 112 having an assembled ply thickness 114, wherein the assembled ply thickness 114 is at least about 0.1 inches. The CMC ply assembly 100 may be susceptible to incomplete densification, resulting in an undesirable incidence of production failure.

Figure 2:
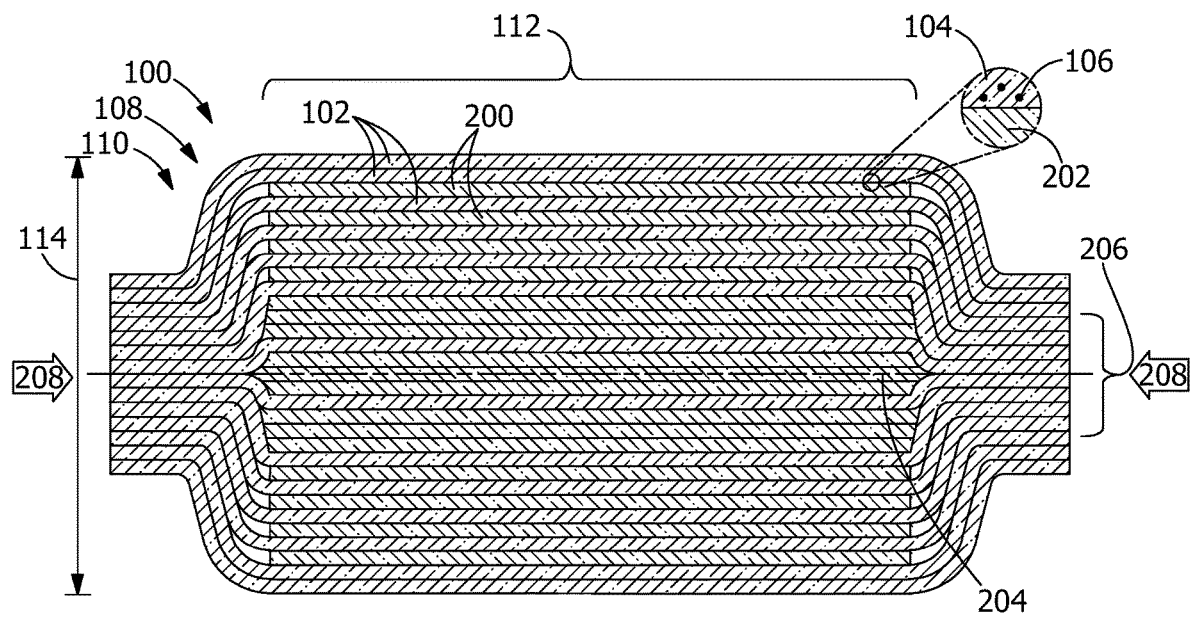
FIG. 2 is a schematic sectional view of a CMC ply assembly, according to an embodiment of the present disclosure.

Referring to FIG. 2, in one embodiment, a CMC ply assembly 100 includes a plurality of CMC plies 102 and at least one matrix ply 200 interspersed amongst the plurality of CMC plies 102. Each of the plurality of CMC plies 102 includes a first matrix 104 and a plurality of ceramic fibers 106. The at least one matrix ply 200 includes a second matrix 202 and is essentially free, alternatively free, of ceramic fibers 106. As used herein, "essentially free" indicates that no ceramic fibers 106 are embedded within and through the at least one matrix ply 200, but allows for the incidental surface penetration of ceramic fibers 106 from an adjacent CMC ply 102. The plurality of CMC plies 102 and the at least one matrix ply 200 are arranged in an undensified ply stack 108 having an article conformation 110. The CMC ply assembly 100 may consist of a single matrix ply 200 or may include a plurality of matrix plies 200.

In one embodiment, the CMC ply assembly 100 includes a portion 112 having an assembled ply thickness 114. The assembled ply thickness 114 is at least about 0.1 inches, alternatively at least about 0.2 inches, alternatively at least about 0.5 inches, alternatively at least about 1 inch, alternatively at least about 1.5 inches, alternatively at least about 2 inches, alternatively at least about 5 inches. The at least one matrix ply 200 is at least partially disposed within the portion 112.

The at least one matrix ply 200 in the portion 112 may be evenly or unevenly distributed across the assembled ply thickness 114 of the portion 112. In one embodiment, portion 112 includes an increased concentration of the at least one matrix ply 200 toward a mid-plane 204 of the portion 112.

Each ply of the at least one matrix ply 200 and the plurality of CMC plies 102 may independently include any suitable thickness, including but not limited to, a thickness of at least about 0.075 mm, alternatively at least about 0.1 mm, alternatively at least about 0.5 mm, alternatively at least about 1 mm, alternatively at least about 1.5 mm, alternatively at least about 2 mm, alternatively at least about 3 mm, alternatively at least about 4 mm, alternatively about 5 mm, alternatively up to about 5 mm, alternatively between about 0.075 mm and about 5 mm.

The portion 112 may include any suitable ratio (thickness) of the at least one matrix ply 200 to the plurality of CMC plies 102, including, but not limited to, a minimum ratio (thickness) of the at least one matrix ply 200 to the plurality of CMC plies 102 of about 1:10, alternatively about 1:5, alternatively about 1:3.

In one embodiment, the portion 112 includes a core region 206 centered about the mid-plane 204 of the portion. As used herein, "centered" is intended to indicate approximation rather than precision, and may deviate from being precisely centered at the mid-plane 204 by up to about 20%. The core region 206 may constitute any suitable segment of the assembled ply thickness 114 of the portion 112, including, but not limited to, about 30% to about 70% of the assembled ply thickness 114 of the portion 112, alternatively about 40% to about 60%, alternatively about 45% to about 55%, alternatively about 50%. The core region 206 may include any suitable ratio (thickness) of the at least one matrix ply 200 to the plurality of CMC plies 102, including, but not limited to, a minimum ratio (thickness) of the at least one matrix ply 200 to the plurality of CMC plies 102 of about 1:1, alternatively about 2:1, alternatively about 3:1, alternatively about 4:1, alternatively about 5:1.

The CMC ply assembly 100 may include any suitable ratio (thickness) of the at least one matrix ply 200 to the plurality of CMC plies 102 (overall for the CMC ply assembly 100), including, but not limited to, a ratio of the at least one matrix ply 200 to the plurality of CMC plies 102 of between about 1:1 to about 1:250, alternatively about 1:3 to about 1:100, alternatively about 1:5 to about 1:75, alternatively about 1:10 to about 1:50, alternatively about 1:2 to about 1:25, alternatively about 1:25 to about 1:50, alternatively about 1:50 to about 1:75, alternatively about 1:75 to about 1:100, alternatively at least about 1:250, alternatively at least about 1:100, alternatively less than about 1:1, alternatively less than about 1:3, alternatively less than about 1:5, alternatively less than about 1:10.

In one embodiment, the first matrix 104 of the plurality of CMC plies 102 includes a material composition which is essentially the same as the second matrix 202 of the at least one matrix ply 200. In another embodiment, the first matrix 104 of the plurality of CMC plies 102 includes a material composition which is distinct from the second matrix 202 of the at least one matrix ply 200. Each of the first matrix 104 and the second matrix 202 may, independently, be selected from any suitable preceramic polymer corresponding upon densification to a ceramic matrix including, but not limited to, carbon, silicon, silicon carbide, silicon nitride, or combinations thereof.

The plurality of ceramic fibers 106 may include any suitable material, including, but not limited to, fibers stable at temperatures exceeding 1000° C., aluminum oxide fibers, carbon fibers, silicon carbide fibers, zirconium oxide fibers, mullite fibers, or combinations thereof.

The at least one matrix ply 200 may include a greater potential to develop porosity during carbonization than the plurality of CMC plies 102. In one embodiment, the porosity is microscopic interconnected porosity. Carbonization may occur at any suitable temperature, including, but not limited to, a temperature from about 800° C. to about 1,200° C. In one embodiment, wherein the first matrix 104 and the second matrix 202 include a preceramic polymer, carbonization includes pyrolytic decomposition of the preceramic polymer, forming a porous carbon structure.

Figure 3:
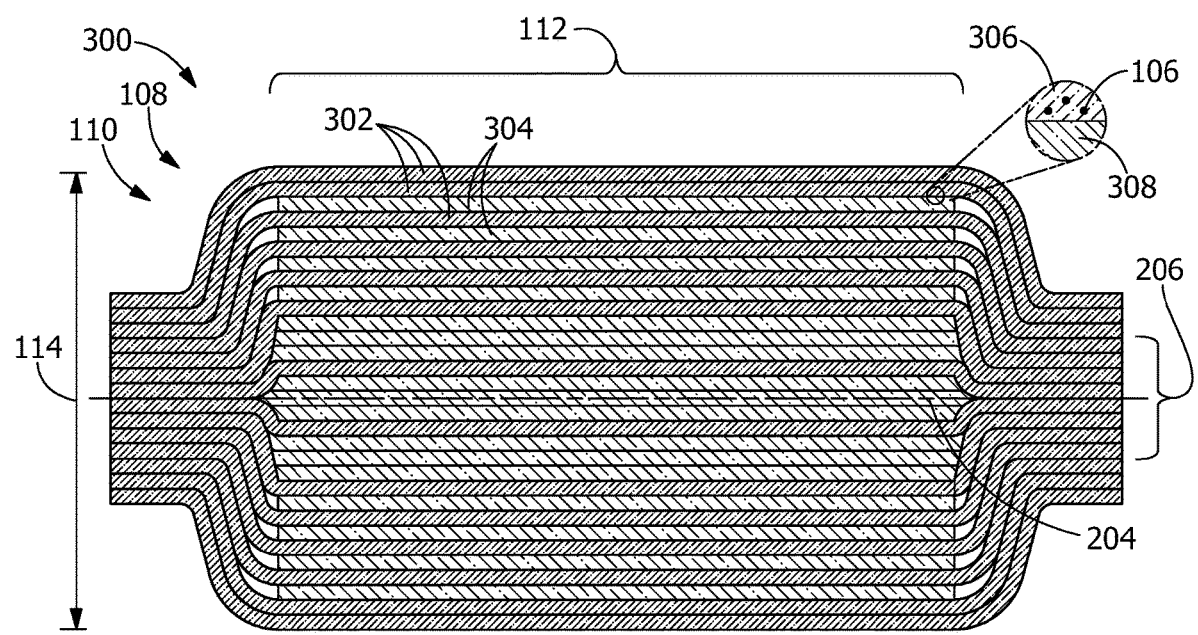
FIG. 3 is a schematic sectional view of a CMC article, according to an embodiment of the present disclosure.

Referring to FIGS. 2 and 3, in one embodiment, a method for forming a CMC article 300 includes forming the CMC ply assembly 100. Forming the CMC ply assembly 100 includes laying up the plurality of CMC plies 102 and interspersing at least one matrix ply 200 amongst the plurality of CMC plies 102, forming the undensified ply stack 108 having the article conformation 110. The CMC ply assembly 100 is carbonized, and a melt infiltration agent 208 is infused into the CMC ply assembly 100. The melt infiltration agent 208 infuses more completely through the at least one matrix ply 200 than through the plurality of CMC plies 102. The CMC ply assembly 100 is densified with the melt infiltration agent 208 to form the CMC article 300. Densifying the plurality of CMC plies 102 may form a plurality of densified CMC plies 302, and densifying the at least one matrix ply 200 may form at least one densified matrix ply 304. Without being bound by theory, it is believed that carburization generates a higher degree of porosity in the at least one matrix ply 200 than the plurality of CMC plies 102, and that the higher degree of porosity formed in the at least one matrix ply 200 promotes more complete diffusion of melt infiltration agent 208 in all directions.

Densifying may include converting the first matrix 104 to a first ceramic matrix 306, and converting the second matrix 202 to a second ceramic matrix 308. The first ceramic matrix 306 and the second ceramic matrix 308 may independently include any suitable compositions, including, but not limited to, carbon, silicon, silicon carbide, silicon nitride, or combinations thereof.

In one embodiment, the plurality of densified CMC plies 302 includes a composition selected from the group consisting of a carbon-fiber-reinforced silicon carbide (C/SiC), a silicon-carbide-fiber-reinforced silicon carbide (SiC/SiC), and combinations thereof.

In one embodiment, melt infiltration of the melt infiltration agent 208 into the CMC ply assembly 100 is more complete in comparison to a comparative method in which the CMC ply assembly 100 lacks the at least one matrix ply 200. By way of example, in one embodiment, melt infiltration of the melt infiltration agent 208 into the CMC ply assembly 100 is about 95% to 100% complete, alternatively about 99% complete, whereas in the comparative method melt infiltration is about 40% to about 90% complete, alternatively about 50% complete. The melt infiltration agent 208 may include any suitable composition, including, but not limited to, a composition including silicon.

Densifying the CMC ply assembly 100 with the melt infiltration agent may include heating the CMC ply assembly 100 and the melt infiltration agent 208 at any suitable temperature. In one embodiment, the suitable temperature is about at the melting temperature of the melt infiltration agent 208 or above the melting temperature of the melt infiltration agent 208, alternatively at least about 1,414° C., alternatively about 1,414° C. to about 1,500° C.

Figure 4:
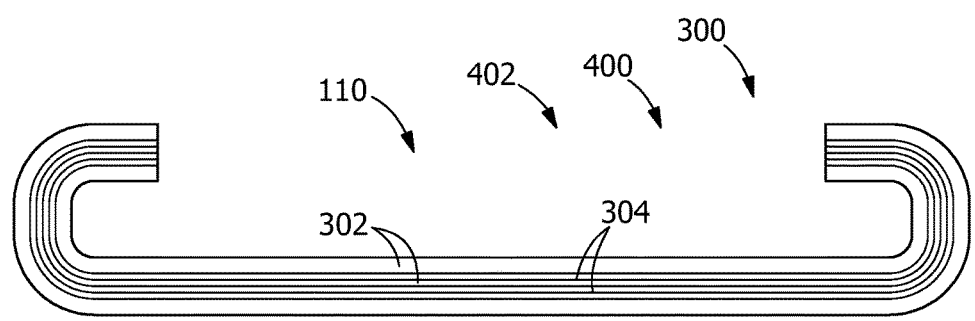
FIG. 4 is a schematic sectional view of a turbine component, according to an embodiment of the present disclosure.

Referring to FIG. 4, the CMC article 300 may be any suitable article 300, including, but not limited to, a turbine component (400). Suitable turbine components may include, but are not limited to, airfoils, buckets (blades), bucket (blade) dovetails, nozzles (vanes), shrouds 402, combustor liners, combustor transition pieces, disks, ducts, augmentors, exhaust nozzles, casings, or combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite (CMC) ply assembly, comprising:
   a plurality of CMC plies, each of the plurality of CMC plies including a first matrix and a plurality of ceramic fibers; and
   at least one matrix ply interspersed amongst the plurality of CMC plies, the at least one matrix ply including a second matrix and being essentially free of ceramic fibers, the second matrix including a preceramic polymer;
   wherein the plurality of CMC plies and the at least one matrix ply are arranged in an undensified ply stack, the undensified ply stack including an article conformation.

2. The CMC ply assembly of claim 1, wherein the at least one matrix ply includes a plurality of matrix plies.

3. The CMC ply assembly of claim 1, further including a portion having an assembled ply thickness of at least about 0.1 inches, and the at least one matrix ply is at least partially disposed within the portion.

4. The CMC ply assembly of claim 3, wherein the portion includes a minimum ratio (thickness) of the at least one matrix ply to the plurality of CMC plies of about 1:10.

5. The CMC ply assembly of claim 4, wherein the portion includes a core region centered about a mid-plane of the portion, the core region constituting about 40% to about 60% of the assembled ply thickness of the portion, the minimum ratio (thickness) of the at least one matrix ply to the plurality of CMC plies of about 1:1 in the core region.

6. The CMC ply assembly of claim 1, further including a ratio (thickness) of the at least one matrix ply to the plurality of CMC plies of between about 1:1 to about 1:250.

7. The CMC ply assembly of claim 1, wherein the at least one matrix ply includes a greater potential to develop porosity during carbonization than the plurality of CMC plies.

8. The CMC ply assembly of claim 1, wherein the article conformation is a turbine component selected from the group consisting of airfoils, buckets (blades), bucket (blade) dovetails, nozzles (vanes), shrouds, combustor liners, combustor transition pieces, disks, ducts, augmentors, exhaust nozzles, casings, and combinations thereof.

9. The CMC ply assembly of claim 1, wherein the first matrix includes a material composition which is essentially the same as the second matrix.

10. The CMC ply assembly of claim 1, wherein the first matrix includes a material composition which is distinct from the second matrix.

11. The CMC ply assembly of claim 1, wherein the plurality of ceramic fibers is selected from the group consisting of fibers stable at temperatures exceeding 1000° C., aluminum oxide fibers, carbon fibers, silicon carbide fibers, zirconium oxide fibers, mullite fibers, and combinations thereof.

12. The CMC ply assembly of claim 1, wherein the at least one matrix ply includes a thickness of at least 1.5 mm.

13. The CMC ply assembly of claim 1, wherein the at least one matrix ply consists of the second matrix and is essentially free of the ceramic fibers.

14. A ceramic matrix composite (CMC) ply assembly, comprising:
   a plurality of CMC plies, each of the plurality of CMC plies including a first matrix and a plurality of ceramic fibers; and
   at least one matrix ply interspersed amongst the plurality of CMC plies, the at least one matrix ply including a thickness of at least 1.5 mm and a second matrix, and being essentially free of ceramic fibers;
   wherein the plurality of CMC plies and the at least one matrix ply are arranged in an undensified ply stack, the undensified ply stack including an article conformation.

15. A ceramic matrix composite (CMC) ply assembly, comprising:
   a plurality of CMC plies, each of the plurality of CMC plies including a first matrix and a plurality of ceramic fibers; and
   at least one matrix ply interspersed amongst the plurality of CMC plies, the at least one matrix ply consisting of a second matrix, and being essentially free of ceramic fibers;
   wherein the plurality of CMC plies and the at least one matrix ply are arranged in an undensified ply stack, the undensified ply stack including an article conformation.

16. A method for forming a ceramic matrix composite (CMC) article, comprising:
   forming a CMC ply assembly, forming the CMC ply assembly including:
      laying up a plurality of CMC plies, each of the plurality of CMC plies including a first matrix and a plurality of ceramic fibers; and
      interspersing at least one matrix ply amongst the plurality of CMC plies, the at least one matrix ply including a second matrix and being essentially free of ceramic fibers,
      wherein the plurality of CMC plies and the at least one matrix ply are arranged in an undensified ply stack, the undensified ply stack including an article conformation;
   carbonizing the CMC ply assembly;
   infusing a melt infiltration agent into the CMC ply assembly, the melt infiltration agent infusing more completely through the at least one matrix ply than through the plurality of CMC plies; and
   densifying the CMC ply assembly with the melt infiltration agent to form the CMC article.

17. The method of claim 16, wherein the CMC ply assembly includes a portion having an assembled ply thickness of at least about 0.1 inches, and the at least one matrix ply is at least partially disposed within the portion.

18. The method of claim 16, wherein melt infiltration into the CMC ply assembly is more complete in comparison to a comparative method in which the CMC ply assembly lacks the at least one matrix ply.

19. The method of claim 16, wherein densifying the CMC ply assembly with the melt infiltration agent includes heating the CMC ply assembly and the melt infiltration agent at a temperature of at least about 1,414° C.

20. The method of claim 16, wherein the melt infiltration agent includes silicon.

\* \* \* \* \*